United States Patent [19]

Izura et al.

[11] 3,812,522

[45] May 21, 1974

[54] COLOR STILL PICTURE PROJECTING APPARATUS

[75] Inventors: Yoshiteru Izura, Toyonaka; Keisuke Okano, Katano, both of Japan

[73] Assignee: Matsushita Electric Industrial Co., Ltd., Osaka, Japan

[22] Filed: Mar. 26, 1973

[21] Appl. No.: 344,922

[30] Foreign Application Priority Data

Mar. 29, 1972 Japan .......................... 47/31867

[52] U.S. Cl. ........................ 358/1, 358/4, 360/10

[51] Int. Cl. .......................... H04n 9/16, H04n 5/80

[58] Field of Search ......... 178/5.4 R, 5.4 CD, 6.6 A

[56] References Cited

UNITED STATES PATENTS 3,229,035 1/1966 Bounsall ............................. 178/6.6

*Primary Examiner*—Robert L. Richardson

*Attorney, Agent, or Firm*—Stevens, Davis, Miller & Mosher

[57] ABSTRACT

A color still picture projecting apparatus is provided in which color picture signals each consisting of a luminance signal and two kinds of color signals different from each other are received, whereby the luminance signals are recorded on a first storage tube and the two different color signals are extracted at every horizontal scanning period to produce a time series signal train which signals are then separately recorded on a target of a second storage tube by at every respective color signals, thereafter the outputs of the first and second storage tubes are read out to reproduce a color still picture. In this way, reproduced pictures of good quality can be obtained.

8 Claims, 10 Drawing Figures

COLOR STILL PICTURE PROJECTING APPARATUS

The present invention relates to an improved color still picture projecting apparatus.

In the past, among the apparatuses used to extract, record and reproduce any desired frame from the NTSC color television signals have been video tape recorders, magnetic disc recorders and the like. However, these prior art recorders have been unsatisfactory with respect to the resolution and picture quality of reproduced pictures. Further, they require a considerable time before the reproduced picture can be projected by reading out the recorded frame. There is a further drawback in that the mechanical transportation of magnetic recording medium and scanning operation have been the causes of the occurrence of noise.

It is therefore an object of the present invention to provide a color still picture projecting apparatus which eliminates these drawbacks for ensuring improved resolution and picture quality of reproduced pictures.

It is another object of the present invention to provide a color still picture projecting apparatus which eliminates the use of mechanical scanning and hence the occurrence of noise and in which the reading may be effected immediately after the recording process.

Other objects and advantages of the present invention will become readily apparent from considering the following detailed description in conjunction with the accompanying drawings, in which.

Figure 1:
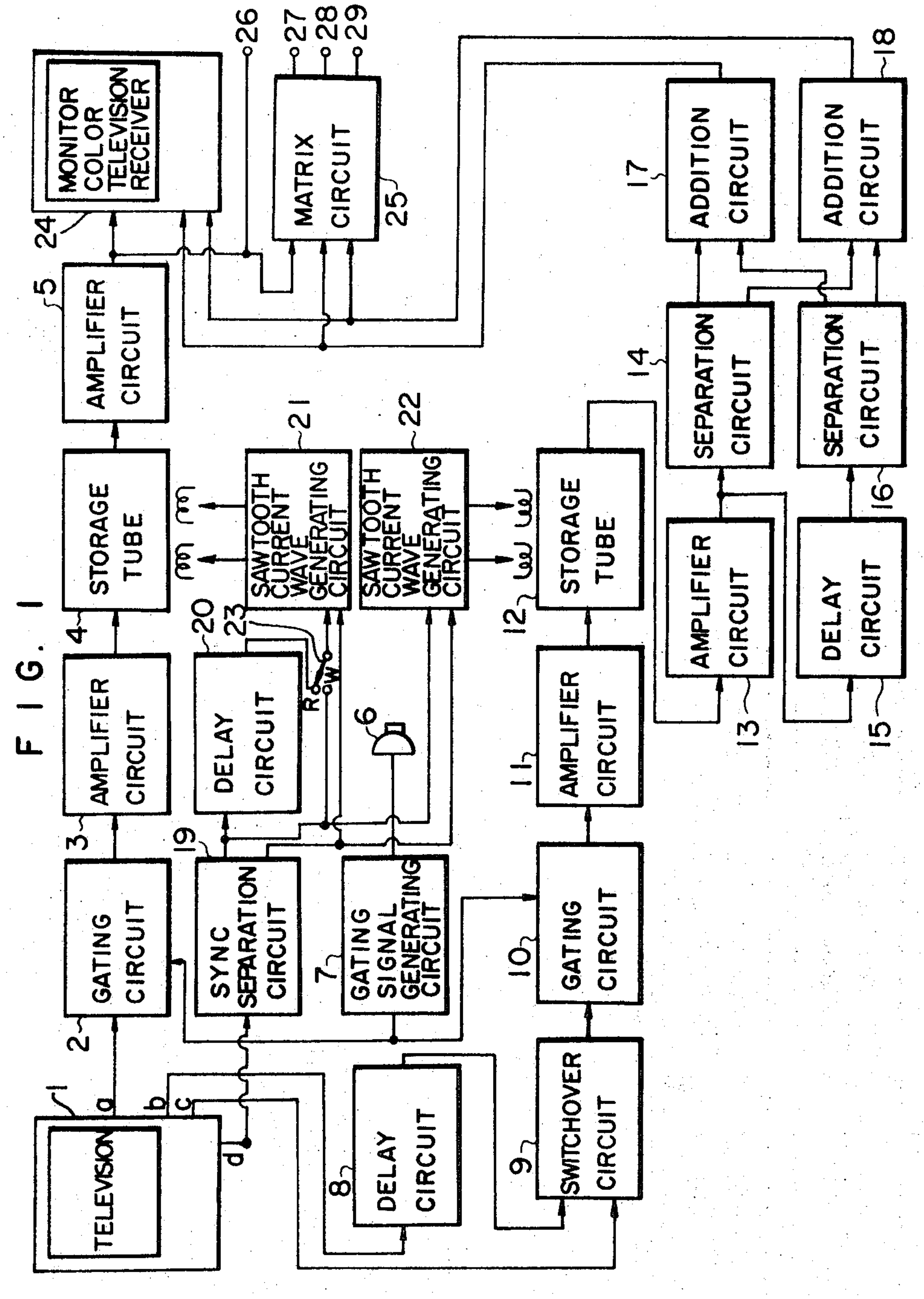
FIG. 1 is a block diagram showing an embodiment of a color picture producing apparatus according to the present invention.

An embodiment of the present invention will now be explained with reference to the accompanying drawings. Referring first to FIG. 1, numeral 1 designates a color television receiver of conventional type excepting that it is further provided with terminals *a*, *b* and *c* for delivering respectively the Y luminance signals and the Z and X color signals and a terminal *d* for delivering the synchronizing signals. Numerals 2 and 10 designate gating circuits for passing only the picture signals for a selected frame period by the output of a gating signal generating circuit 7 which is actuated by the operation of a manual switch 6. Numeral 3 designates an amplifier circuit for the luminance signals, 4 a storage tube for recording the luminance signals, 5 an amplifier circuit for the read-out signals. Numeral 8 designates a circuit for introducing a delay corresponding to one horizontal scanning period, 9 a circuit for switching to the line sequential mode, 11 a circuit for amplifying the color signals, 12 a storage tube for reording the amplified color signals, 13 an amplifier circuit for the read-out color signals. Numerals 14 and 16 designate circuits for separating the input signals at different output terminals on a line-sequential time-division basis, 15 a circuit for introducing a delay corresponding to one horizontal scanning period 17, and 18 addition circuits. Numeral 19 designates a sync separation circuit for separating the synchronizing signals from the output of the color television receiver 1, 20 a delay circuit for delaying the vertical driving pulses by one horizontal scanning period, 21 and 22 circuits for generating sawtooth wave currents for horizontal and vertical deflections, 23 a switch for changing the synchronizing signals for the recording and reading processes, 24 a monitor color television receiver. Numeral 25 designates a matrix circuit, and numerals 26, 27, 28 and 29 designate output terminals for delivering the luminance signals and the red, green and blue signals for displaying a still picture.

Figure 2:
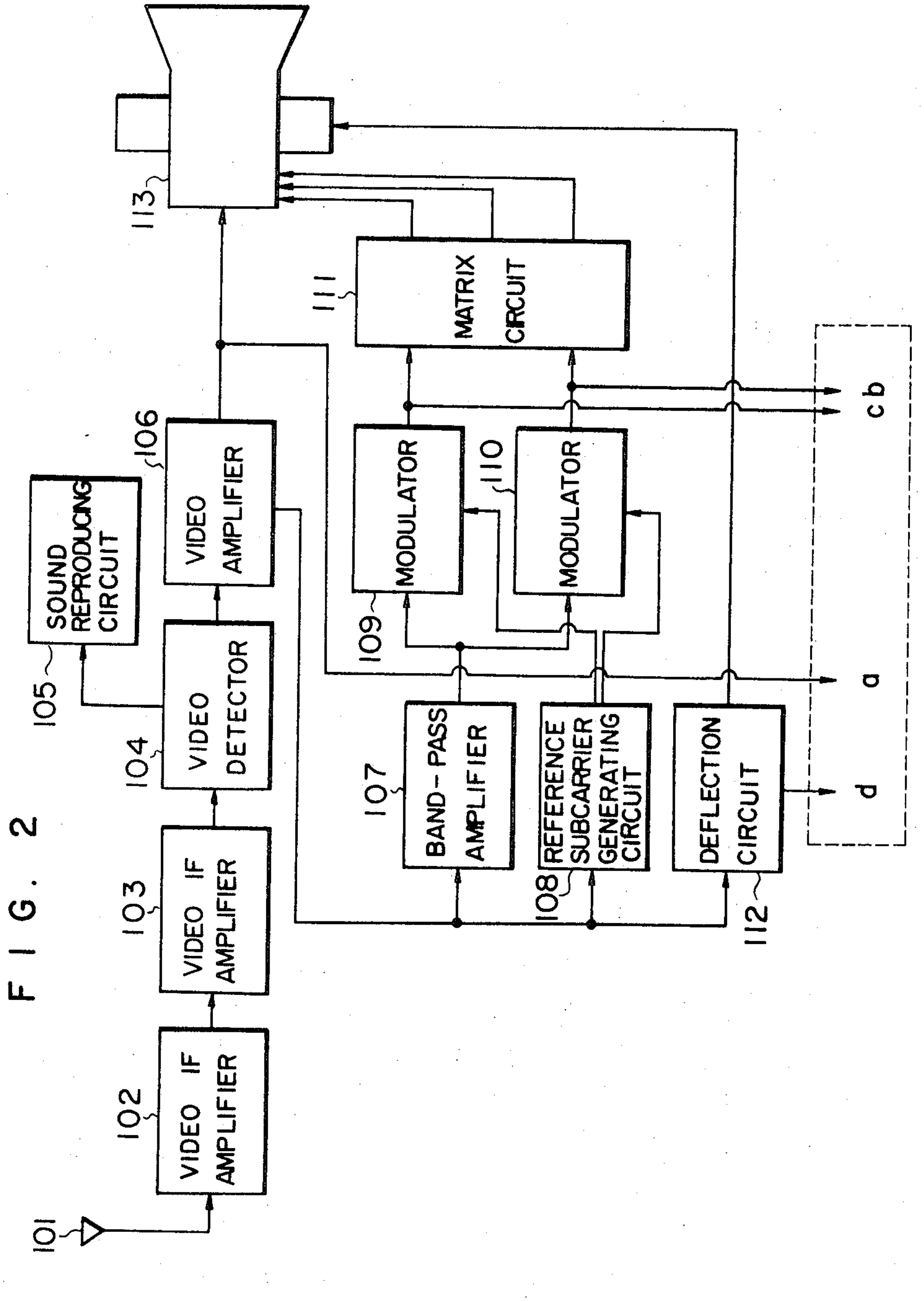
FIG. 2 is a block diagram of the color television receiver shown in FIG. 1.

The construction of the color television receiver shown in FIG. 1 is illustrated in FIG. 2. In the figure, numeral 101 designates an antenna for receiving the television signals, 102 a tuner, 103 a video IF amplifier, 104, a video detector, 105 a circuit for processing the sound signals to reproduce the sound. Numeral 196 designates a video amplifier, 107 a band-pass amplifier for taking out the carrier chrominance signals, 108 a circuit for providing reference subcarriers. Numerals 109 and 110 designate demodulators which receive the carrier chrominance signal and the reference subcarrier to effect respectively the X and Y axis demodulations, 111 a matrix circuit for producing color difference signals from the input color signals, 112 a deflection circuit for generating horizontal and vertical deflection currents, 113 a cathode ray tube for receiving the luminance signals and color difference signals to reproduce the picture.

The color television receiver 1 shown in FIG. 1 consists of a conventional color television receiver constructed as above described in which the luminance signals, X and Z axis color signals and synchronizing signals are taken from the circuits 106, 110, 109 and 112.

Figure 3:
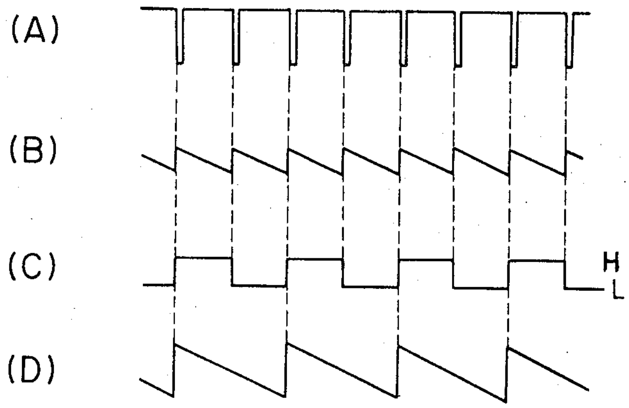
FIGS. 3 to 5 are signal waveform diagrams for the color television receiver of FIG. 2.
Figure 4:
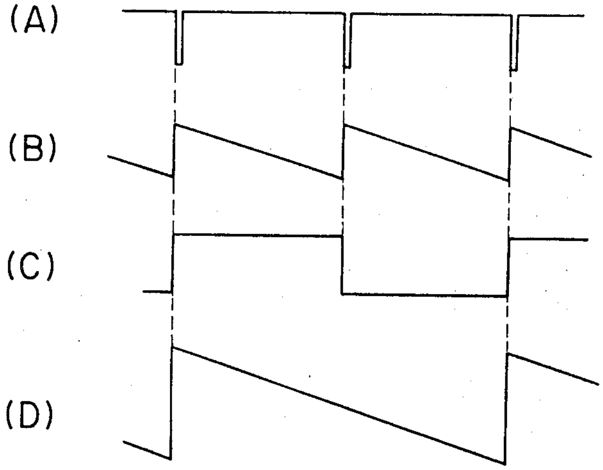

The operation of the embodiment shown in FIG. 1 will now be explained. The deflection process during the recording of the storage tubes 4 and 12 will be explained first. In the storage tube 4, the regular deflection is performed. In other words, the change-over switch 23 is thrown to a W position and the sawtooth current wave generating circuit 21 produces the horizontal deflection signal shown in FIG. 3(B) in synchronism with the horizontal synchronizing signal of FIG. 3(A) which was separated by the sync separation circuit 19. Also the vertical deflection signal shown in FIG. 4(B) is generated in synchronism with the vertical synchronizing signal shown in FIG. 4(A). These deflection signals are applied to the storage tube 4 so that the process of scanning similar to the process of raster scanning in a conventional television receiver is performed. As regards the vertical deflection operation, for the reasons that will be explained later, the vertical synchronizing signal is applied to the sawtooth current wave generating circuit 21 through the delay circuit 20 and the switch 23 only during the reading operation, thereby delaying to some extent the time for initiating the vertical deflection.

In the storage tube 12, the scanning process differs from that performed in the storage tube 4. The sawtooth current wave generating circuit 22 produces, in synchronism with the horizontal synchronizing signal shown in FIG. 3(A), the sawtooth wave shown in FIG. 3(B) and the rectangular wave shown in FIG. 3(C), and these two signals are superimposed on each other, producing the signal shown in FIG. 3(D) which is applied to the storage tube 12 as the horizontal deflection signal. Also in the sawtooth current wave generating circuit 22, the sawtooth wave shown in FIG. 4(B) and the rectangular wave shown in FIG. 4(C) are superimposed on each other in synchronism with the vertical synchronizing signal shown in FIG. 4(A), producing the vertical deflection signal shown in FIG. 4(D) which is applied to the storage tube 12. In this connection, the rectangular waves shown in FIGS. 3(C) and 4(C) are produced by driving flip-flops or the like in synchronism with the horizontal and vertical synchronizing signals respectively.

Next, the writing operations for the storage tubes 14 and 12 are subject to the above-mentioned deflection processes will be explained. The signals shown respectively in FIGS. 5(B), 5(C) and 5(D) by way of typical example are produced at the output terminals *a*, *b* and *c* of the color television receiver 1. In this case, let it be assumed that the luminance signals shown in FIG. 5(A) are represented as shown in FIG. 5(B), for example.

When a picture is reproduced by the television receiver 1 which is desired to be recorded into and then read out from the storage tubes 4 and 12 for projection as a still picture on the monitor color television receiver 24, the switch 6 is operated. When this occurs, the gating signal generating circuit 7 produces an output, whereby the picture signals for the period of this selected frame are passed through the gating circuits 2 and 10. The luminance signals shown in FIG. 5(B) which have been passed through the gating circuit 2 are, after amplification in the amplifier circuit 3, applied to the storage tube 4 to effect the recording.

Figure 5:
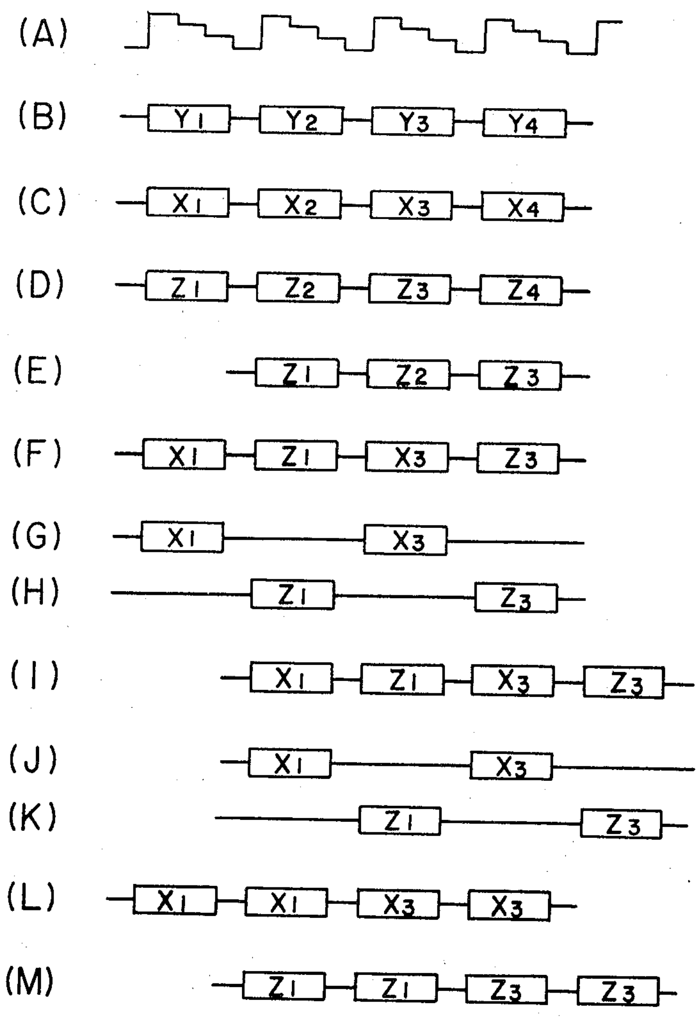
Figure 6A:
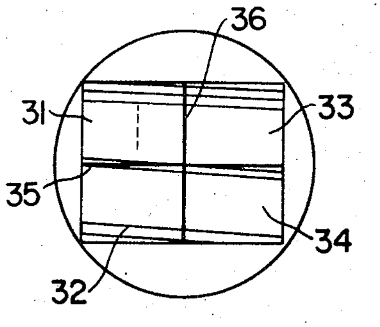
FIGS. 6A, 6B and 6C show different manners in which the color signals are recorded on the target surface of the storage tube.

On the other hands, the Z signals derived from the color television receiver 1 as shown in FIG. 5(D) are delayed in the delay circuit 8 by one horizontal scanning period, producing the signals shown in FIG. 5(E). The switchover circuit 9 receives the output of the delay circuit 8 and the X signals derived from the color television receiver 1 as shown in FIG. 5(C), so that the two signals are alternately extracted at intervals of one horizontal scanning period, producing the signal train consisting of the X and Z signals as shown in FIG. 5(F). These signals are extracted only for the duration of one frame immeditely following the depression of the switch 6 and the extracted signals are recorded on the storage tube 12 after amplification in the amplifier circuit 11. Namely, these signals are recorded on the storage target as shown in FIG. 6A. In this figure, the X signals are recorded on the portions designated as 31 and 32, while the Z signals are recorded on other portions designates as 33 and 34. Those portions which are designated as 35 and 36 correspond to tee blanking periods. In this case, no interlacing is performed.

Next, the operation for reading the signals recorded on the storage tubes 4 and 12 and projecting the still picture will be explained. The signals, FIG. 5(F), read from the storage tube 12 are, after amplification in the amplifier circuit 13, applied to the separation circuit 14 where the signals are separated into and delivered respectively at output terminals *e* and *f* as the X signals shown in FIG. 5(G) and the Z signals shown in FIG. 5(H). The output of the amplifier circuit 13 is also applied to the delay circuit 15 where it is delayed by one horizontal scanning period, thereby producing the signals shown in FIG. 5(I). These signals are then applied to the separation circuit 16 so that the X signals shown in FIG. 5(J) and the Z signals shown in FIG. 5(K) are generated respectively at output terminals *g* and *h*. Consequently, the addition circuits 17 and 18 produce respectively the X signals shown in FIG. 5(L) and the Z signals shown in FIG. 5(M).

In this case, since the color signals generated from the addition circuits 17 and 18 have been delayed by one horizontal scanning period, the position of the switch 23 is changed so that the vertical deflection during the reading process of the luminance signals is delayed by one horizontal scanning period of the action of the delay circuit 20 to thereby adjust the phase of the luminance signals to that of the color signals.

In this manner, the luminance signals, the X signals and the Z signals are reproduced and the monitor television receiver 24 is operated by these outputs to reproduce the color still picture. Further, for the purposes of color print reproduction or for driving the cathode ray tube with the R, G and B signals, the Y, X and Z signals are applied to the matrix circuit 25 to produce the output for color print reproduction or the output corresponding to red, blue and green colors.

Figure 6B:
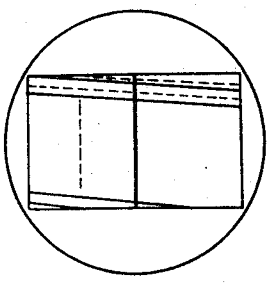

Another embodiment of the recording process of the storage tube 12 will now be explained. By utilizing the signal shown in FIG. 3(D) as the horizontal deflection signal and the signals shown in FIG. 4(B) as the vertical deflection signal, the color signals may be recorded on the storage tube 12 as shown in FIG. 6B. In other words, the recording is performed in such a manner that the X and Z signals are separately recorded on the right and left portions of the target of the storage tube 12 and the interlacing is performed similarly with the scanning process in the television receiver.

Figure 6C:
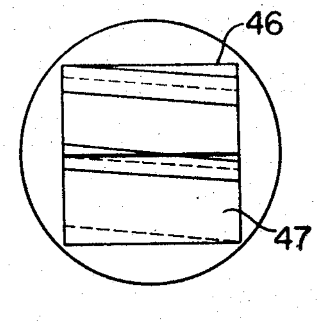
Figure 7:
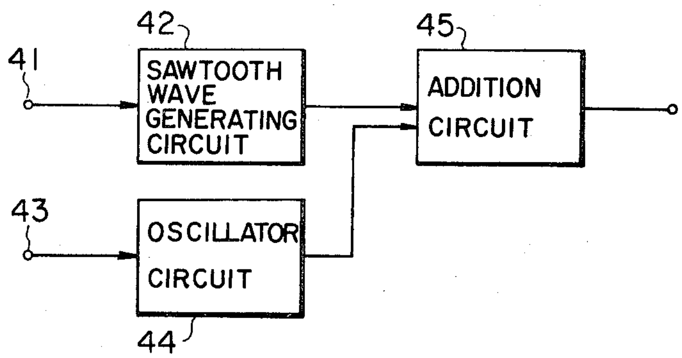
FIG. 7 is a circuit diagram showing the principal part of the deflection circuit for generating deflection signals to be applied to the storage tube.
Figure 8:
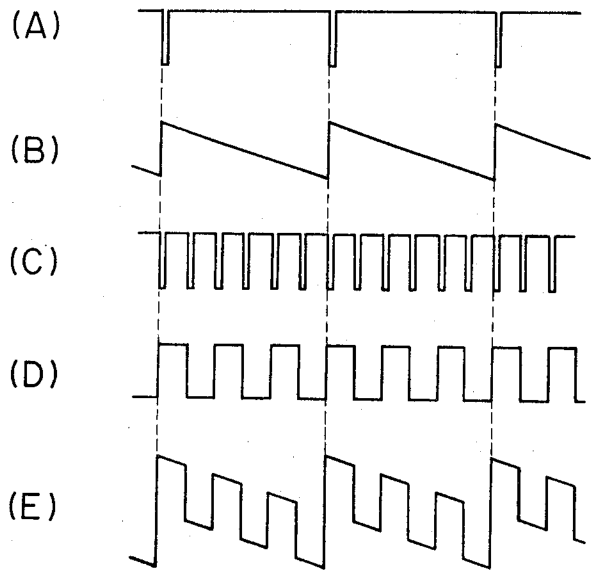
FIG. 8 is a signal waveform diagram for the deflection circuit of FIG. 7.

Still another process of recording the signals on the storage tube 12 will be explained. In the deflection circuit in FIG. 7, a sawtooth wave generating circuit 42 produces the sawtooth wave shown in FIG. 8(B) in synchronism with the vertical synchronizing signal of FIG. 8(A) applied at a terminal 41. Further, in synchronism with the vertical synchronizing signal, FIG. 8(C), applied at a terminal 43, an oscillator circuit produces the pulse output shown in FIG. 8(D). The outputs of the circuits 42 and 44 are added in an addition circuit 45, producing the vertical deflection signals shown in FIG. 8(E). This vertical deflection signal and the horizontal deflection signal shown in FIG. 3(B) may be applied to the deflection system of the storage tube 12 to record the signals on the storage target as shown in FIG. 6C. In other words, the X and Z signals may be separately recorded on upper and lower portions 46 and 47, respectively.

Further, while, in the embodiment so far described, the X and Z signals have been utilized as the color signals, the present invention is not limited to these signals and the I and Q signals, R and B signals or other combination of the color signals may be utilized.

As described hereinbefore, the two color signals constituting the color picture signal are extracted at intervals of one horizontal period, separately stored on the different portions of the target of the storage tube, read out in a line sequential manner, separated into the respective color signal groups and superimposed on the respective signals delayed by one horizontal scanning period respectively, thereby providing the color signals for projecting the picture. Therefore, the picture quality will not be deteriorated considerably even if the position of the scanning lines during the recording process differs somewhat from that of the scanning lines during the reproduction process. Further, the separation between the two color signals is excellent. Moreover, by virtue of the delay means, the signals read from the storage tube provide the color signals in each of the scanning lines and thus the color harshness is not conspicuous.

What we claim is:

1. A color still picture projecting apparatus comprising: means for separately receiving luminance signals and first and second color signals which are different from each other; a first storage tube for receiving said luminance signals, means for extracting said first and second color signals at every horizontal scanning period to convert them into a single time series signal train; a second storage tube for receiving said time series signal train in a manner such that said first and second color signals are recorded respectively on two different areas of a target of said second storage tube; means for separating said color signals derived by alternately reading said two areas on a target of said second storage tube into said first and second color signals respectively; and means for receiving said separated first and second color signals and said luminance signals read from said first storage tube to project a color still picture.

2. A color still picture projecting apparatus according to claim 1, wherein said conversion means comprises first delay means for delaying either one of said first and second color signals by one horizontal scanning period, and switchover means for alternately selecting and producing at every horizontal scanning period the other one of said first and second color signals and the output of said delay means at the same output terminal.

3. A color still picture projecting means according to claim 1, wherein said means for separating the signals read from the second storage tube comprises a first separation circuit for receiving said read-out signals to deliver said received signals alternately at each one of two output terminals at every horizontal scanning period, second delay means for delaying said read-out signals by one horizontal scanning period, a second separation circuit for delivering output signals of said second delay means alternately at each one of two output terminals at every horizontal scanning period, first adding means for adding outputs from respective one of the output terminals of said first and second separation circuits, and second adding means for adding outputs from the other of the output terminals of said first and second separation circuits.

4. A color still picture projecting apparatus according to claim 3, wherein among horizontal and vertical synchronizing signals applied to a circuit for generating reading deflection signals to be applied to the first storage tube, the vertical synchronizing signal is applied to said deflection signal generating circuit through a delay line for one horizontal scanning period.

5. A color still picture projecting apparatus according to claim 1, further including a circuit for generating vertical and horizontal deflection signals whose periods are respectively two times as long as periods of the vertical and horizontal deflection signals applied to the first storage tube, whereby the deflection in the second storage tube is effected by an output of said deflection signal generating circuit.

6. A color still picture projecting apparatus according to claim 1, further including a circuit for generating a vertical deflection signal and a horizontal deflection signal, the period of said vertical deflection signal being equal to that of the vertical deflection signal for the first storage tube, the period of said horizontal deflection signal being twice as long as that of the horizontal deflection signal for the first storage tube, whereby the deflection in the second storage tube is effected by an output of said deflection signal generating circuit.

7. A color still picture projecting apparatus according to claim 1, further including a circuit for generating a vertical deflection signal and a horizontal deflection signal, said horizontal deflection signal being the same with the horizontal deflection signal for the first storage tube, said vertical deflection signal being produced by superimposing on the vertical deflection signal for the first storage tube a rectangular wave synchronized with the horizontal synchronizing signal for said horizontal deflection signal, whereby the deflection in the second storage tube is effected by an output of said deflection signal generating circuit.

8. A color still picture projecting apparatus according to claim 1, further including means for receiving color television signals from a selected channel and separating from said color television signals luminance signals and color signals, and means for extracting the luminance signals and color signals belonging to a selected frame, whereby said extracted luminance signals and color signals are respectively applied and recorded on said first and second storage tubes.

* * * * *